United States Patent Office 3,312,144
Patented Apr. 4, 1967

3,312,144
COLOUR PHOTOGRAPHY
Denis Manktelow Neale, Ilford, England, assignor to Ilford Limited, Ilford, Essex, England, a British company
Filed Nov. 9, 1964, Ser. No. 409,795
Claims priority, application Great Britain, Nov. 21, 1963, 46,068/63
7 Claims. (Cl. 88—24)

This invention concerns the printing of multicolour transparencies and particularly colour negatives on to multicolour print material selectively photosensitive to three spectral bands, typically red, green and blue.

It is known practice to print such transparencies through red, green and blue filters in turn, the exposure of the print material to light of each colour being controlled by a single photocell. This method has the merit that, should the sensitivity of the photocell change from day to day, the exposure to each colour is changed substantially in the same proportion and the colour of the print is not effected adversely although the print will be lighter or darker as a result of the change in photocell sensitivity. The method has the drawback of requiring a total time to print a transparency which time is at least the sum of the individual times of exposure to red, green and blue light.

It is also known practice to print multicolour transparencies with light containing red, green and blue bands, the exposure of the print material to light of each colour being controlled by a separate photocell. This method has the merit of reducing the time required to print a transparency to the longest time of exposure required for any one spectral band. The method has the drawback that change in sensitivity in any one photocell will result in a change in colour of prints made subsequent to that change of sensitivity.

It is an object of the present invention to provide a method of printing multicolour transparencies in which exposure of the print material to light of each of three colours is controlled, e.g. by a single photocell, and in which the total time required to print a transparency need not exceed the time of exposure to a first colour or the sum of the individual times of exposure to the other two colours, whichever is the longer.

The method is particularly well adapted to the printing of integrally masked colour negatives, such as "Ilfocolor" and "Kodacolor" negatives. The integral yellow mask gives these negative a relatively high density to blue light. Consequently, it is commonly found that when print material is exposed to red, green and blue light, the exposure time to blue light must be approximately twice the exposure time to red light or green light if a satisfactory print is to be obtained. It is proposed to take advantage of this fact by exposing the print material to blue light concurrently with consecutive exposures to red and green light. It is furthermore proposed to assess blue light before printing commences so that the same photocell may be used to assess consecutively the red light and green light exposures during printing.

According to the invention, therefore, a method of printing multicolour transparencies on to multicolour print material selectively sensitive to light in three spectral bands comprises illuminating the transparency with light containing at least a first spectral band, making a preliminary photoelectric assessment of the intensity of light passing the transparency in said first spectral band, initiating printing using light containing said first spectral band and a second spectral band, photoelectrically assessing the integral of time and light intensity passing said transparency in said second spectral band, until a predetermined integral is reached, changing the quality of printing light to exclude said second spectral band, but to include a third spectral band, photoelectrically assessing the integral of time and light intensity passing said transparency in said third spectral band until a predetermined integral is reached, then excluding said third spectral band from printing light, the first spectral band being excluded from printing light after a time interval measured from initiation of printing and controlled by an electronic timing circuit, so that the product of said time interval and preliminary photoelectric assessment of intensity of light in said first spectral band shall be substantially constant, printing terminating when all of said three spectral bands have been excluded as herein described.

According to one embodiment of the invention, the time for which the printing light includes the first spectral band is controlled to be substantially in inverse proportion to the intensity of light in said first spectral band as determined by said preliminary photoelectric assessment.

According to an alternative embodiment of the invention, the printing light intensity is adjusted to establish a substantially constant intensity of light in said first spectral band as determined by said preliminary photoelectric assessment and the time for which the printing light includes said first spectral band is controlled and substantially constant.

According to a further alternative embodiment of the invention printing light intensity in said first spectral band is adjusted to one of a plurality of alternative predetermined intensities such that, when the printing light source cannot be adjusted to provide a given, higher intensity of transmitted light, the printing light source is adjusted to provide an alternative, lower intensity of transmitted light, the electronic timing circuit being adjusted to administer an exposure to light in said first spectral band at said lower intensity, the predetermined time of which exposure is substantially in the same proportion to the predetermined time of exposure to light at said higher intensity as is the higher intensity in proportion to the lower intensity.

According to a further embodiment of the invention, an electronic timing circuit is used to control the time of exposure to printing light in said first spectral band, said timing circuit including a capacitor which is charged at alternative, predetermined rates during exposure of print material to said second and third bands, said predetermined rates being substantially in proportion to the transmissions in the first spectral band of colour selective filters placed in the path of printing light to exclude light in said third and second bands, respectively.

According to a particular embodiment of the invention, the said first, second and third spectral bands are respectively the blue, green and red bands of the spectrum.

According to an alternative particular embodiment of the invention, the said first, second and third spectral bands are respectively the blue, red and green bands of the spectrum.

According to a preferred form of the invention, the photocell used to assess the first spectral band is used subsequently to assess the second and third spectral bands.

A specific embodiment of apparatus, and the manner of its use, is illustrated in the accompanying drawings. In these drawings.

Figure 1:
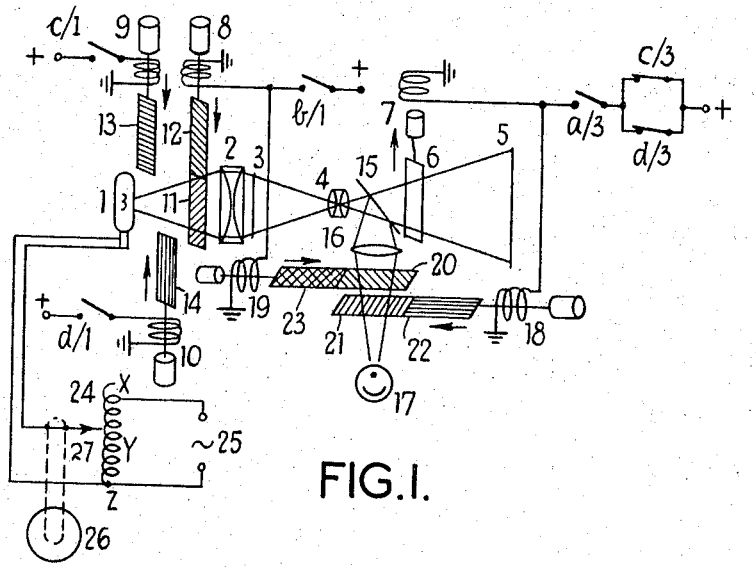
FIG. 1 represents the optical system and the means for controlling intensity and quality of colour of printing light in a photographic colour negative printer.

Referring to these drawings in FIG. 1 light from a lamp 1 is focussed by a condensing lens 2 to pass through a colour negative 3 and an objective lens 4. The objective lens 4 forms an image of the negative 3 on the print material 5 when the shutter 6 is withdrawn by the solenoid 7 operating in the direction shown by the arrow.

Quality of printing light is controlled by operation of further solenoids 8, 9 and 10, each of which is illustrated in the position occupied when it is de-energised. Operation of solenoid 8 causes a magenta filter 11 in the path of printing light to be replaced by a cyan filter 12. Energisation of solenoids 9 and 10 respectively result in the insertion of a blue filter 13 and a yellow filter 14 in the path of printing light.

An inclined glass plate 15 deflects a proportion of printing light passing lens 4 whence the deflected beam is focussed by lens 16 onto a vacuum photocell 17. With solenoids 18 and 19 de-energised, the said deflected beam passes in succession through a magneta filter 20 and a blue filter 21. Energisation of solenoids 18 and 19 respectively result in the replacement of the blue filter 21 by the yellow filter 22 and the replacement of the magenta filter 20 by the green filter 23.

The lamp 1 is operated from a variable voltage transformer 24 connected to an alternating current supply 25. The voltage applied to the lamp may be varied by operation of the motor 26 which is mechanically coupled to the control spindle of the variable transformer 24.

Figures 2, 3:
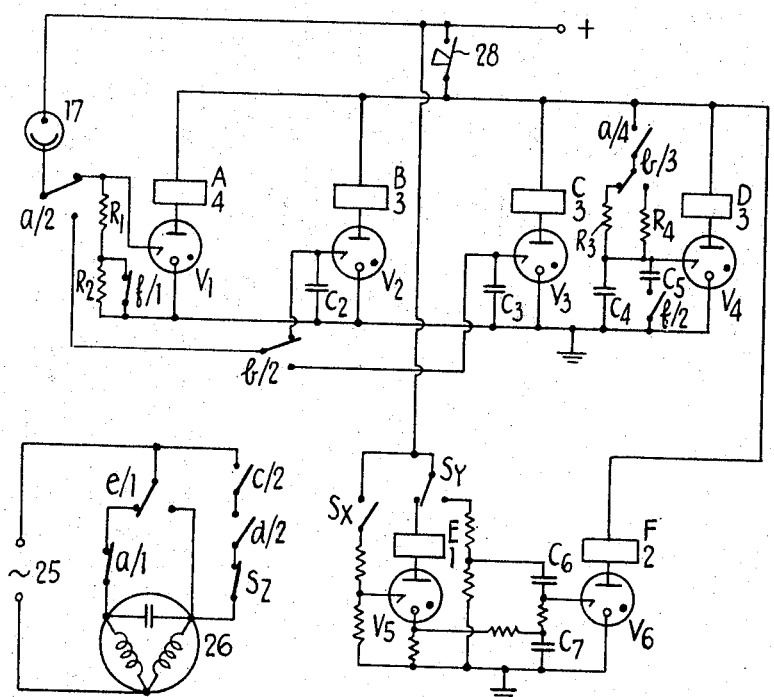
FIG. 2 represents the electronic control circuit required to operate components shown in FIG. 1.
FIG. 3 represents a circuit controlling operation of a motor represented in FIG. 1.

In FIG. 3 it will be seen that the motor 26 is a reversible split phase induction motor operating from the alternating current supply 25, through contacts on relays A, C, D, E and a limit switch $S_z$.

In FIG. 2 the trigger tubes $V_1$, $V_2$, $V_3$ and $V_4$ control respectively the setting of intensity of blue printing light, the exposure integral of red printing light, the exposure integral of green printing light and the exposure time to blue printing light. (The function of trigger tubes $V_5$ and $V_6$ is described below.) In FIGS. 1–3, all relay contacts are indicated in the positions occupied when the corresponding relays are de-energised.

The operation of the printing machine will now be described. Before initiation of a printing cycle, the machine normally rests with trigger tubes $V_1$, $V_2$, $V_3$, $V_4$ conducting and relays A/4, B/3, C/3 and D/3 energised. In this condition, contacts $a/1$ are open and contacts $c/2$ and $d/2$ are closed, thereby causing motor 26 to move the sliding contact 27 of the variable transformer 24 to the end marked Z in FIG. 1, thereby opening contacts on a limit switch $S_z$ and de-energising motor 26. The lamp 1 thus receives substantially no supply from the transformer 24 in this condition. To initiate a printing cycle the manual key switch 28 is briefly opened thereby extinguishing the discharges in tubes $V_1$ to $V_4$, causing relays A/4, B/3, C/3, D/3 to release and thereby causing all solenoids to assume the positions indicated in FIG. 1. Release of relays C/3 and D/3 causes contacts $c/2$ and $d/2$ to open. Release of relay A/4 causes contacts $a/1$ to close thereby causing motor 26 to drive the sliding contact 27 of transformer 24 towards the end of the winding indicated by X in FIG. 1. As this proceeds a progressively increasing voltage is applied to lamp 1 which therefore provides a progressively increased light output. No light can as yet reach the print material 5 because shutter 6 obstructs the printing path as shown. Blue light from lamp 1 can however pass the magenta filter 11, colour negative 3, and after deflection by the glass plate 15 can pass also the magenta filter 20 and blue filter 21 to reach the vacuum photocell 17. The photo-current passed by photocell 17 is proportional to the incident intensity of blue light. This photo-current flows through load resistor $R_1$ and contacts $f/1$ to ground. The positive potential of the trigger electrode of $V_1$, is therefore proportional to the intensity of blue light transmitted by negative 3. With a typical negative the light output from lamp 1 soon increases to a value such that the potential of the trigger electrode of $V_1$ is raised to the critical value at which the tube fires. When $V_1$ fires relay A/4 is energised and the contact $a/1$ opens so that the motor 26 stops and lamp 1 continues to pass through negative 3 a substantially constant and pre-determined intensity of blue printing light. Energisation of relay A/4 causes contacts $a/3$ to close so that solenoid 7 is energised to withdraw the shutter 6 from the path of printing light. Exposure of print material to blue and red light passing magenta filter 11 thus commences. Closure of contacts $a/4$ initiates the timing of exposure of the print material to blue light which is determined by the charging of capacitor C4 through resistor R3 or R4 until trigger tube $V_4$ fires. Closure of contacts $a/3$ energises also solenoid 18 thereby substituting yellow filter 22 for the blue filter 21 in the path of light reaching photocell 17. Thus only red light can now pass the magenta filters 11, 20 and the yellow filter 22 to reach the photocell 17. Energisation of relay A/4 furthermore operates contacts $a/2$ so that the photo-current from photocell 17 flows via $a/2$ and $b/2$ to charge the capacitor C2. Photocell 17, capacitor C2, trigger tube $V_2$ and relay B/3 now comprise a conventional integrating exposure circuit of known type. Red light of printing quality reaching photocell 17 produces a photo-current charging capacitor C2 until the voltage appearing across C2 is sufficient to fire trigger tube $V_2$ and thereby to energise relay B/3.

Energisation of relay B/3 closes contacts $b/1$ thereby energising solenoid 8 which substitutes the cyan filter 12 for the magenta filter 11 in the path of printing light. Thus printing light no longer contains red light, but now contains green light in addition to the blue light which will still be present if trigger tube $V_4$ has not yet fired. Closure of contacts $b/1$ results also in the energisation of solenoid 19 thereby substituting the green filter 23 for the magenta filter 20 in the path of light reaching photocell 17. Thus only green light of printing quality can now pass cyan filter 12, negative 3 green filter 23, and yellow filter 22 to reach the photocell 17. Energisation of relay B/3 has furthermore operated contacts $b/2$ so that the photocurrent delivered by photocell 17 is now proportional to the intensity of green light of printing quality passing via contacts $a/2$ and $b/2$ to the capacitor C3. It will now be recognised that photocell 17, capacitor C3, trigger tube $V_3$ and relay C/3 form an integrating exposure control circuit of known type controlling the exposure to green light of the print material 5. When a sufficient charge has been accumulated in capacitor C3, trigger tube $V_3$ fires and energises relay C/3. Energisation of relay $c/3$ closes contacts $c/1$, energises solenoid 9 and inserts in the path of printing light the blue filter 13, thereby terminating exposure of the print material 5 to green light.

Exposure of print material 5 to blue light may however still continue since blue light is still free to pass blue filter 13, cyan filter 12 and negative 3 provided trigger tube $V_4$ has not yet fired. When the capacitor C4 has charged sufficiently, however, $V_4$ fires to energise relay D/3. Contacts $d/1$ then close to energise solenoid 10 and insert in the path of printing light the yellow filter 14 thereby terminating exposure of the print material 5 to blue light.

It will be noted that should $V_4$ fire before $V_3$ the exposure to green light may continue after the termination of exposure to blue light since green light can pass the yellow filter 14, the cyan filter 12 and negative 3.

When relays C/3 and D/3 are both energised, the exposure of print material 5 to all three colours, red, green and blue, is complete. Opening of contacts $c/3$ and $d/3$ causes solenoid 7 to release thereby allowing shutter 6 once more to obstruct the path of printing light. Closure of contacts $c/2$ and $d/2$ causes motor 26 to turn the moving contact 27 of transformer 24 in a direction reducing the voltage applied to lamp 1. When the moving contact 27 approaches the end of the winding marked Z, a limit switch $S_z$ opens and thereby stops the motor. The equipment is now once more in the "at rest" position.

The function of contacts $b/3$ will now be described.

It will be appreciated that the initial estimation of blue printing light intensity is made wth the magenta filter 11 in the path of light reaching negative 3. If the minor absorbancies to blue light of the magenta filter 11 and the cyan filter 12 are not substantially equal the print material 5 will receive an exposure to blue light which, measured as an integral of blue light intensity against time, will depend on the relative times for which the magenta and cyan filters 11 and 12 are in operative position. This limitation is overcome in the apparatus described here by arranging that the rate of charging of capacitor C4 shall be substantially proportional to the blue light transmission of whichever filter, 11 or 12, is in the path of printing light at any time. For this purpose the resistances R3 and R4 are chosen to be substantially in the same ratio as the blue light transmittances of filters 12 and 11 respectively. When relay B/3 energises and thereby causes filter 12 to be substituted for filter 11, contacts $b/3$ operate so that the rate of charging of capacitor C4 changes appropriately and the total time of exposure to blue light is either increased or decreased to compensate for an early operation of relay B/3, according to whether substitution of filter 12 for filter 11 produces a reduction or an increase in the intensity of blue light reaching negative 3.

In the foregoing description it has been assumed that tube $V_1$ will fire before motor 26 causes lamp 1 to operate at maximum intensity. When an abnormally dense negative is to be printed the moving contact 27 of transformer 24 may reach the end of the winding marked X before an intensity of blue light reaches photocell 17 sufficient to fire trigger tube $V_1$. In this event a mechanical limit switch $S_x$ closes and causes trigger tube $V_5$ to fire energising relay E/1. Contacts $e/1$ now operate reversing the direction of rotation of motor 26 and so once more reducing the intensity of light emitted by lamp 1. When the moving contact 27 reaches the point Y near the end marked Z, a third limit switch $S_y$ operates de-energising relay E/1, and furthermore causing a positive-going pulse to be applied through capacitor C6 to the trigger electrode of tube $V_6$. Since C5 was conducting immediately prior to operation of limit switch $S_y$, a positive charge will be present at capacitor C7. This charge applies a positive bias to the trigger electrode of tube $V_6$ which, in combination with the positive-going pulse applied through C6 causes $V_6$ to fire energising relay F/2. Contacts $f/1$ now open placing photocell load resistor $R_2$ in series with photocell load resistor $R_1$ and contact $f/2$ closes to place timing capacitor C5 in parallel with timing capacitor C4. Release of relay E/1 causes contacts $e/1$ to return to the position indicated and motor 26 reverses once more to increase progressively the voltage applied to lamp 1. As the photocell load resistance now comprises R1 and R2 in series, $V_1$ will fire at a predetermined level of blue light incident on photocell 17, which level is lower than normal in the ratio $R_1/(R_1+R_2)$. It is furthermore arranged that $R_2/R_1$ approximately equal $C5/C4$, and it accordingly follows that the exposure time to blue light is extended in proportion to the reduction in pre-adjusted intensity of blue light. Any abnormality in intensity of red or green printing light wll be compensated automatically by the integrating action of capacitors C2 and C3 respectively.

When an exposure has been completed with relay F/2 energised, the "at rest" condition of the apparatus comprises $V_1$ to $V_4$ conducting, $V_5$ non-conducting and $V_6$ conducting. Initiation of a further exposure cycle extinguishes the discharge in $V_6$ in addition to extinguishing the discharges in $V_1$ to $V_4$.

I claim as my invention:

1. A method of printing multicolour transparencies onto multicolour print material selectively sensitive to light in three spectral bands which comprises illuminating the transparency with light containing at least a first spectral band, making a preliminary assessment of the intensity of light passing the transparency in said first spectral band, initiating printing using light containing said first spectral band and a second spectral band, assessing the integral of time and light intensity passing said transparency in said second spectral band, until a predetermined integral is reached, changing the quality of printing light to exclude said second spectral band, but to include a third spectral band, assessing the integral of time and light intensity passing said transparency in said third spectral band until a predetermined integral is reached, then excluding said third spectral band from printing light, the first spectral band being excluded from printing light after a time interval measured from initiation of printing and controlled, so that the product of said time interval and preliminary assessment of intensity of light in said first spectral band shall be substantially constant, printing terminating when all of said three spectral bands have been excluded.

2. A method according to claim 1 wherein the time for which the printing light includes the first spectral band is controlled to be substantially in inverse proportion to the intensity of light in said first spectral band as determined by said preliminary assessment.

3. A method according to claim 1 wherein the printing light intensity is adjusted to establish a substantially constant intensity of light in said first spectral band as determined by said preliminary assessment and the time for which the printing light includes said first spectral band is controlled and substantially constant.

4. A method according to claim 1 wherein printing light intensity in said first spectral band is adjusted to one of a plurality of alternative predetermined intensities such that, when the printing light source cannot be adjusted to provide a given, higher intensity of transmitted light, the printing light source is adjusted to provide an alternative, lower intensity of transmitted light, an electronic timing circuit being adjusted to administer an exposure to light in said first spectral band at said lower intensity, the predetermined time of which exposure is substantially in the same proportion to the predetermined time of exposure to light at said higher intensity as is the higher intensity in proportion to the lower intensity.

5. A method according to claim 1 wherein an electronic timing circuit is used to control the time of exposure to printing light in said first spectral band, said timing circuit including a capacitor whch is charged at alternative, predetermined rates during exposure of print material to said second and third bands, said predetermined rates being substantially in proportion to the transmissions in the first spectral band of colour selective filters placed in the path of printing light to exclude light in said third and second bands, respectively.

6. A method according to claim 1 wherein the said first, second and third spectral bands are respectively the blue, green and red bands of the spectrum.

7. A method according to claim 1 wherein a photocell used to assess the first spectral band is used subsequently to assess the second and third spectral band.

References Cited by the Examiner

UNITED STATES PATENTS 3,115,807  12/1963  Craig et al. _____ 88—24
3,229,569   1/1966  Frost et al. _____ 88—24

NORTON ANSHER, *Primary Examiner.*

R. A. WINTERCORN, *Assistant Examiner.*